No. 843,457. PATENTED FEB. 5, 1907.
W. H. HOLSCLAW.
PLANTER.
APPLICATION FILED SEPT. 10, 1903.
2 SHEETS—SHEET 1.
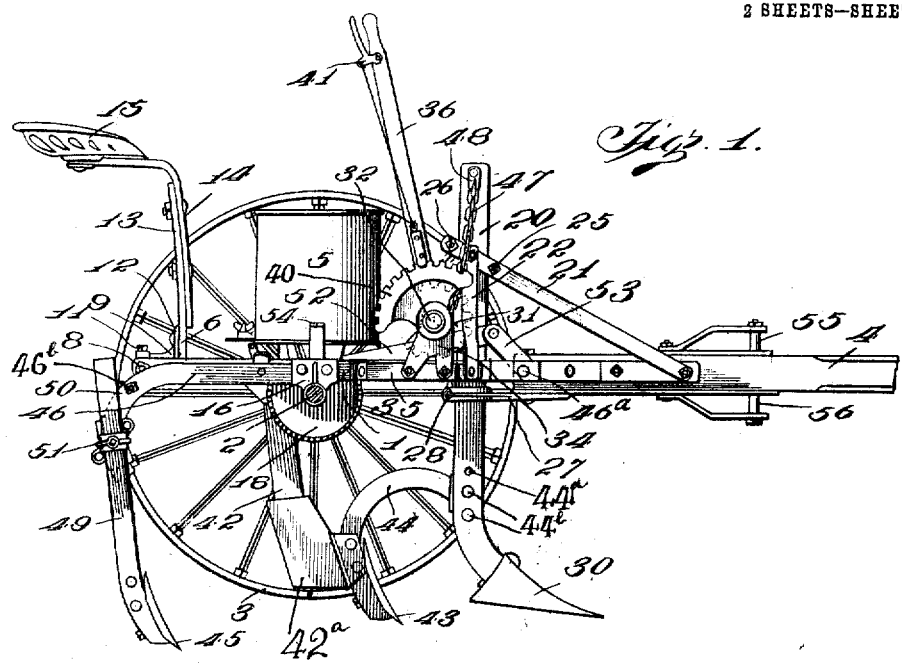
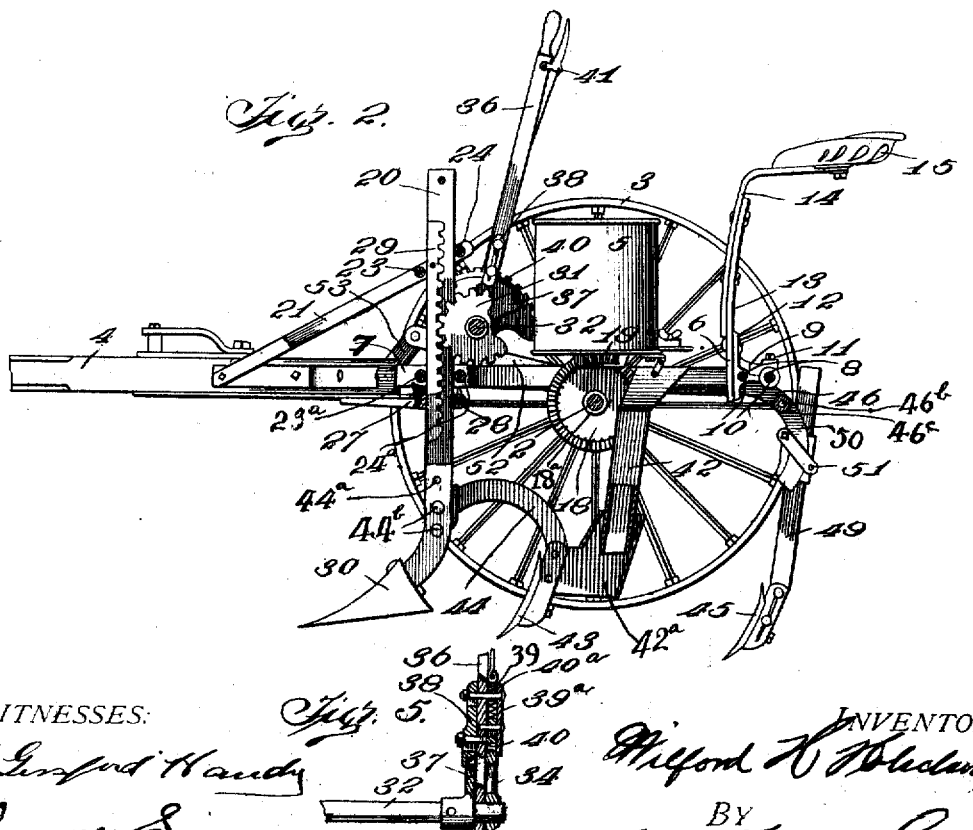
WITNESSES:
INVENTOR
By
Attorneys

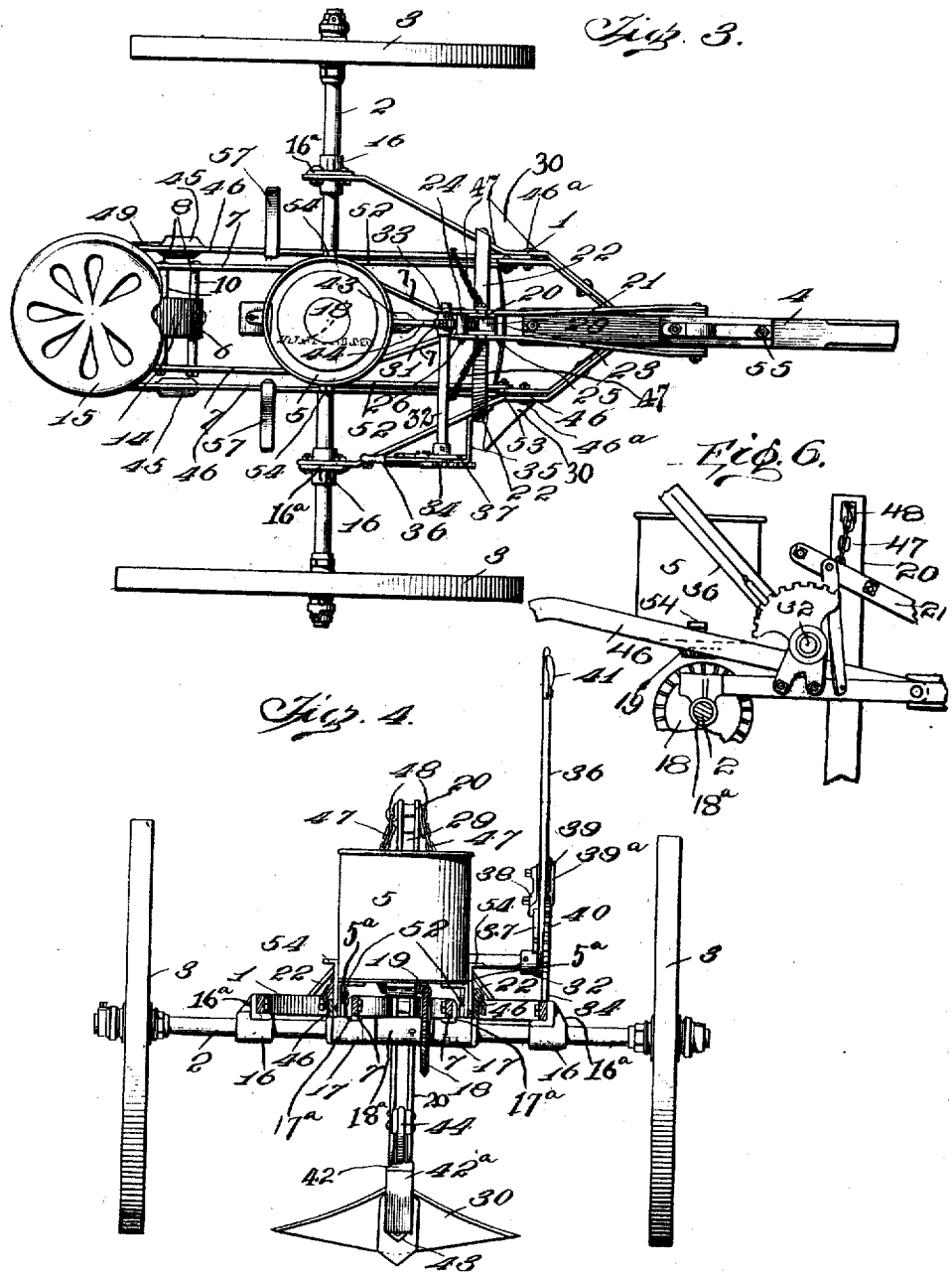

UNITED STATES PATENT OFFICE.

WILFORD H. HOLSCLAW, OF LOUISVILLE, KENTUCKY, ASSIGNOR TO B. F. AVERY & SONS, OF LOUISVILLE, KENTUCKY, A CORPORATION OF KENTUCKY.

PLANTER.

No. 843,457.　　Specification of Letters Patent.　　Patented Feb. 5, 1907.

Application filed September 10, 1903. Serial No. 172,647.

*To all whom it may concern:*

Be it known that I, WILFORD H. HOLSCLAW, a citizen of the United States, residing at Louisville, in the county of Jefferson and State of Kentucky, have invented certain new and useful Improvements in Planters; and I do hereby declare the following to be a full, clear, and exact description of the invention, such as will enable others skilled in the art to which it appertains to make and use the same.

The invention relates to improvements in planters of the type designed for sowing various kinds of seeds; and the object in view is the provision of a draft-receiving standard, means carried thereby for preparing the soil for the reception of the seed, said standard being arranged to be moved for moving the soil-preparing means into and out of operative position, combined with means for delivering seed to the prepared soil, the seed-delivering means being so constructed as to be susceptible of being moved out of operative condition, means for covering the delivered seed, said covering means being capable of being moved out of operative position, and means for simultaneously moving said standard vertically and moving said soil preparing means, said delivering means, and covering means out of operative condition.

With this and other objects in view, which will become obvious hereinafter, the invention comprises certain novel constructions, combinations, and arrangement of parts, as will be hereinafter fully described and claimed.

In the accompanying drawings, forming a part of this application, Figure 1 is a side elevation of a seed-planter involving one embodiment of the present invention. Fig. 2 is a vertical longitudinal section through the central portion of the planter, portions being shown in side elevation. Fig. 3 is a top plan view of the planter. Fig. 4 is a rear elevation thereof. Fig. 5 is a detail sectional view through a part of the operating-lever and its sectors. Fig. 6 is a detail view showing a portion of the planter-frame and illustrating the manner of mounting the seed-hopper thereon, the gears being shown slightly separated.

In embodying the present invention in practical form, I preferably provide a framing 1, which may be termed a "rigid" frame, which framing is supported by an axle 2, mounted on carrying-wheels 3. The framing 1 is made up, preferably, of flat bars, but may be formed, of course, of any suitably-shaped material, the bars being arranged to converge near their front ends and terminating in forwardly-extending parallel portions overlapping the sides of a tongue 4, retaining-bolts being passed through the parallel portions and the tongue. The bars comprising framing 1 diverge rearwardly, as clearly seen in Fig. 3, and then extend rearwardly substantially parallel to each other. The said bars are thus spaced apart at their rear ends, the two inner bars 7 7 of framing 1 being connected at their rear ends by bolts 8 8, which, with the bars 7, form what may be termed an "inner loop" or "inner frame." The bars 7 are prevented from spreading laterally by bolts 8, and each of the bolts 8 is provided with a surrounding sleeve or tube 10, which is of a length equal to the distance apart of the bars 7, each of said sleeves or tubes having its ends engaging the inner faces of the bars 7 for preventing movement of the bars 7 toward each other. The bars 7 are bolted intermediate their length to the upstanding shoulders 17ª, formed on bearing-sleeves 17, which sleeves are loosely mounted on the axle 2. The two outer bars of framing 1 produce what may be termed an "outer" frame. Bearing-sleeves 16, formed with upstanding shoulders 16ª, are loosely mounted on the axle 2, and the bars of the outer frame are bolted to the shoulders 16ª of said sleeves.

A seat 15 is provided and carried by a standard 6, formed, preferably, of an upper part 14 and a lower part 13, connected together by suitable bolts in such manner that the upper and lower parts of the standard are susceptible of adjustment with respect to each other. A block 9 is provided with apertures for receiving the bolts 8, together with their sleeves, and said block 9 is formed with a vertical bearing-face 12, to which the lower end of standard 6 is bolted or otherwise suitably secured. The block 9 is preferably firmly retained in place by a set-screw 11, threaded through the block into engagement with one of the bolts 8. The seat 15 is disposed at the rear of the framing and in the longitudinal central line thereof.

In front of the seat 15 is arranged a seed box or hopper 5, which is provided with suitable seed-dropping mechanism of any preferred type, (not illustrated,) which dropping mechanism is arranged to be operated by a gear-wheel 19. The gear 19 is adapted during operation to mesh with a gear 18 for being actuated thereby, the said gear 18 being fixed to a sleeve 18ª, as clearly seen in Fig. 4, which sleeve surrounds and is fixed to the axle 2. Said sleeve 18ª is of sufficient length to extend from one of the bearing-sleeves 17 to the other of the bearing-sleeves 17, so that said bearing-sleeves are prevented from being moved toward each other, and owing to the rigidity of the connection between the inner and outer frames of framing 1 the sleeve 18ª determines the position of the framing 1 and parts carried thereby with respect to the axle. To the hopper 5 are secured brackets 5ª 5ª, which brackets are also secured to a pivotally-mounted frame embodying side bars 52 52. The side bars 52 extend forwardly and upwardly from beneath the hopper and at their forward ends are pivotally connected to upwardly-extending bars 53 53, which bars 53 are fixed in the forward end of the framing 1. The bars 52 when the hopper 5 is in its lowermost position rest upon the bearing-sleeves 17, as clearly seen in Fig. 4, the hopper 5 being thus supported by said bars upon the said sleeves 17 when the seed-dropping mechanism is in operative position. The hopper 5 is provided at each side with a stop or projection 54, extending laterally therefrom across the path of movement of operating means, hereinafter described. Preferably pivotally connected with the bottom of the hopper in the usual manner and arranged to receive the discharge therefrom is a chute 42, which chute extends into a delivering-boot 42ª, carried by a curved bar 44, which bar also carries a furrow-opening shovel 43. The chute 43 projects loosely into the said boot, so that the said boot and chute may be moved telescopically and independently of each other.

In the framing 1, immediately in the rear of the tongue 4, is arranged a standard 20, which standard is vertically and longitudinally shiftable. The standard is engaged above the framing 1 by an upstanding bracing-frame, which is fixed to the framing 1. Said upstanding frame consists, preferably, of inclined bars or straps 21 and laterally-arranged inclined bars or straps 22, the bars 21 being secured at their front ends to the framing 1 and to the tongue 4 by a bolt passing through the connected parts. The laterally-arranged inclined bars 22 are fixed to and extend from the upper portion of the bars 21 outwardly and downwardly to and are connected with the bars of the outer frame of the framing 1. The bars 21 are spaced apart at the upper ends a sufficient distance for accommodating the standard 20 therebetween. The bars 21 are connected at their upper ends by bolts 25 and 26, the bolt 25 being surrounded by an antifriction-roller 23 and the bolt 26 being surrounded by a similar antifriction-roller 24, said antifriction-rollers being preferably in the form of sleeves adapted to engage the respective front and rear edges of the standard 20 to guide and position the standard, while permitting free reciprocation thereof. The antifriction-rollers 23 and 24 are of a length equal to the space between the bars 21 and have their ends engaging the inner faces of said bars, so as to prevent the bars from being moved toward each other. It is thus seen that the said upstanding frame serves to guide the standard 20 and at the same time to prevent the upper end of the standard from being thrown forwardly or otherwise moved out of proper position when subjected to the strain due to the draft. The standard 20 also extends between the bars 7 of the inner frame of framing 1, and the said bars 7 are provided with connecting-bolts carrying antifriction-rollers 23ª and 24ª, engaging the opposite edges of the standard 20. A draw-bar 27 is fixed to the under face of the tongue 4 and extends rearwardly to the standard 20. The rear end of draw-bar 27 is provided with a yoke or stirrup surrounding the standard, the rear of said yoke being supplied with an antifriction-roller 28, which engages the rear edge of the standard in position for subjecting the standard to draft, the entire draft applied to the standard 20 being applied through the yoke and its associated parts. The standard, therefore, does not receive its draft through the framing 1, and hence does not tend to strain the framing during operation.

The standard 20 is designed to be freely reciprocated vertically, and I have illustrated in the drawings an efficient means for accomplishing this result which involves a special construction of standard. The standard 20 consists of a pair of plates with a rack-bar 29 interposed therebetween. The parts of the standard are of course firmly bolted or otherwise rigidly secured together, and the teeth of the rack-bar 29 are preferably disposed rearwardly in position for being engaged by a gear 31, which gear has its periphery projecting between the side plates of the standard while meshing with the teeth of the rack-bar 29. The gear 31 is fixed to a rock-shaft 32, which in operation constitutes a shifter rock-shaft, and which shaft is journaled at its inner end in a standard 33, rising from the framing 1, and the outer end of said shaft is journaled in a standard 34, rising from an extension-frame 35, which extension-frame projects laterally from one of the bars of the outer frame of the framing 1. It is of course obvious that any suitable bearings may be provided for the shaft 32 aside from those specifically described. A sector 37 is rigidly fixed to the rock-shaft 32, preferably near the outer end thereof, and a lever 36 has its lower end loosely fitted upon the shaft 32 contiguous to sector 37. An adjustable latch 38 is carried by the lever 36 in position for engaging any of the notches formed in the periphery of sector 37. The latch 38 is preferably slotted longitudinally and clamped rigidly in place by suitable bolts or other retaining means for locking the lever 36 and sector 37 against independent movement. When it is desired to alter the relation of the lever 36 to the shaft 32, the bolts or other retaining means for the latch 38 are loosened, and the latch is raised out of engagement with the notches of sector 37. The lever 36 is then swung to the new position desired and the latch is dropped into the proper notch of the sector 37, and the bolts tightened for again rigidly securing the lever 36 to the sector 37. Thus in operation when the lever 36 is swung the sector 37 will move with it and the shaft 32 will be correspondingly moved. In order to retain the shaft 32 at any given adjusted position, the lever 36 is provided with any suitable, preferably spring-actuated, latch 39, which latch is longitudinally slotted and is arranged to successively engage the notches of a rack 40, which rack is rigidly fixed to the standard 34. The latch 39 is preferably connected by a suitable rod with a bell-crank lever 41, pivoted near the free end of the lever 36 in position for forming a hand or grip lever for manipulating the latch 39. The latch 39 is preferably inclosed in a housing 39ª, (seen best in Fig. 5,) which housing is retained in place by a rivet, bolt, or other securing means passed through the housing and through the lever 36, said rivet also extending through the longitudinal slot formed in the latch 39. As indicated in Fig. 5, one of the bolts which retains the latch 38 in place may be utilized also as a retaining means for the housing 39ª, the said bolt extending from said housing through the longitudinal slot in the latch 39, through the lever 36, and through the slot in the latch 38. A spacing-sleeve 40ª may be provided for the last-mentioned bolt for preventing housing 39 from being pressed toward the lever 36.

The lower end of the standard 20 is preferably curved forwardly for adapting it to receive a cultivating-point 30 or other implement designed to prepare the soil for the furrow-opener 43. In employing the planter for planting cotton or corn I preferably fix to the lower end of the standard 20 a double-winged sweep 30, which sweep is adapted for taking off a portion of the ground, usually at the top of a ridge, and leaving the ground over which the sweep passes at a proper height for the planting of the corn or cotton. The standard is of course adapted for receiving various forms of cultivating-points—as, for instance, when "listing" cotton or corn, a double-moldboard plow, or what is known as a "middle burster," is usually applied to the standard.

The curved bar 44 has its front end extending between the side plates of the standard 20 and secured therebetween by bolts 44ᵇ 44ᵇ, which are passed through the standard 20 and through said curved bar 44. The standard 20 is provided with apertures 44ª for the reception of the bolts 44ᵇ, and it is obvious that as many of the apertures 44ª may be provided as desired, so that the curved bar 44 may be adjusted longitudinally of the standard 20 by simply removing the bolts 44ᵇ, moving the bar 44 to the desired position, and then replacing the bolts 44ᵇ in the new set of apertures 44ª. Thus the furrow-opening shovel 43 may be adjusted vertically with respect to the standard 20 and the sweep 30, the depth of the furrow produced by shovel 43 being accordingly varied, and the boot 42ª, carried by bar 44, may be adjusted with respect to the chute 42, said boot serving as a shiftable section of the chute.

Pivoted to the framing 1 is a drag-bar frame which is mounted to swing pivotally in vertical planes, the said pivoted frame consisting of side bars or drag-bars 46 46, which are spaced apart, one being positioned between each of the bars 7 and the contiguous bar of the outer frame of the framing 1, the forward end of each of the bars 46 pivotally engaging a bolt 46ª, passed through the respective bar of the outer frame and through the contiguous bar 53. The rear ends of the bars 46 are curved downwardly, as indicated at 50, said bars 46 extending rearwardly beyond the rear ends of the bars 7 of the inner frame of the framing 1. A transverse bolt 46ᵇ connects bars 46 near the rear end thereof, the said bars 46 being spaced apart by a sleeve 46ᶜ, which surrounds the bolt 46ᵇ, the said bolt and sleeve being at a sufficient distance in the rear of the rear ends of the bars 7 to permit the free upward swinging of the pivoted frame. Below the bolt 46ᵇ the curved rear ends 50 of the bars 46 are engaged by adjustable clamps 51, each of said clamps carrying a shovel-standard 49. The lower end of each shovel-standard 49 carries a covering-shovel 45. It is of course obvious that when one of the clamps 51 is moved about the curved portion 50 of the respective bar 46 the angular relation of the respective shovel 45 to the surface of the earth will be altered. The bars 46 are a sufficient distance apart and so positioned as to cause the shovels 45 to engage the ground along lines parallel with the line of travel of the furrow-opening shovel 43 and on opposite sides thereof, so as to fill or partly fill the furrow opened by the shovel 43, and as the shovels 45 are in the rear of the chute 42 the grain deposited therefrom will be covered.

It will be observed from Fig. 4 of the drawings that each of the bars 46 extend beneath one of the lateral projections 54, each of the projections being spaced a sufficient distance above the respective bar 46 for permitting free articulation of the drag-bar frame, so as to enable the shovels 45 to accommodate themselves to the usual unevenness of the surface of the ground without the bars 46 engaging projections 54. It is obvious, of course, that when the drag-bar frame is lifted to a certain degree the bars 46 will come into contact with the projections 54, and if the bars 46 are then lifted still further the hopper 5 will be swung in vertical planes upwardly out of operative position, the gear 19 being disconnected from the gear 18. The frame embodying the bars 52 serves to guide the hopper 5 in its movement and after the hopper has been lifted guides it in its return to the proper position for having the gear 19 again mesh with the gear 18 when the bars 46 are lowered.

In order to make possible the ready manipulation of the drag-bar frame for accomplishing the moving of the seed-hopper to an inoperative position, the respective bars 46 of said drag-bar frame are engaged by chains 47, which chains extend to the standard 20 and are detachably connected therewith by means of suitable hooks or other detachable connecting means 48 48. It is to be observed that each of the chains 47 may have any one of several of its links engage the corresponding connecting means 48, so that the said chain is adjustable vertically with respect to the standard 20, and the drag-bar frame is also thereby rendered adjustable with respect to said standard 20, the said drag-bar frame being of course adjusted in vertical planes with the vertical adjustment of the chains 47. It is of course obvious that other means may be employed for connecting the standard 20 with the bars 46 as may be found desirable, the function of such connecting means being principally to transmit motion from one of the connected elements to the other. In the particular embodiment of the invention seen in the drawings movement is imparted from the standard 20 through chains 47 to the drag-bar frame; but other movement may be transmitted by other connecting means within the spirit of the present invention. There is, however, a special advantage in the use of the chains 47 in the particular embodiment illustrated in the drawings, as the said chains permit the free pivotal movement of the bars 46. It is of course obvious that when the chains 47 are taut the beams 46 are still at liberty to swing pivotally upwardly, but may not swing downwardly below the limit fixed by the taut conditions of the chains. It is, however, noted that in operation the standard 20 is sufficiently lowered to permit the chains 47 to remain slack. The drag-bar frame is thus free to be lifted independently of the lifting means illustrated—as, for instance, by grasping the said frame and manually lifting the same—and when so lifted the bars 46 will engage the projections 54 and move the hopper 5 for disconnecting the operating-gear thereof. It is to be observed in this connection that the bars 46 are free to swing downwardly in operation and would strike the axle 2 but for the fact that the bearings 17 are elongated sufficiently for having their outer ends form seats to support the bars 46 when the bars are in their lowermost position. This prevents the bars 46 from ever having their lower edges rest upon a revolving shaft.

When only a light draft is required, due to the conditions of the soil and the nature of the implement applied to the lower end of the standard 20, the draft is applied to the upper portion 55 of a pin or bolt, which pin or bolt is passed through the tongue 4 and through the front end of the draw-bar 27; but when a heavier draft is required the draft is preferably applied to the lower end 56 of the same bolt, so that the heavier draft will be caused to act directly upon the draw-bar 27. This places the greatest strain directly upon the rear edge of the standard 20, a greater proportion of draft being required for producing forward movement of the standard 20 with its implements in the ground than for producing a forward movement of the balance of the planter.

As clearly seen in Fig. 3, rests may be provided for the feet of the operator, such foot-rests consisting of treads 57, secured to and projecting laterally from the bars 46 in front of the seat 15.

From the foregoing it is to be observed that when it is desired to operate the present improved planter in conveying the planter to the field the lever 36 is swung downwardy and rearwardly, which causes the standard 20 to be raised, elevating the chains 47 and the drag-bars 46, and consequently lifting the hopper 5 to an inoperative position. All of the parts of the planter except the carrier-wheels are thus free from the ground and the seed-dropping mechanism is in an inoperative condition. After the planter arrives at the field where the planting is to be done the lever 36 is swung upwardly and forwardly sufficiently for lowering the standard 20 to the desired extent, which results in permitting the chains 47 to become slack, allowing the bars 46 to drop to a position permitting the shovels 45 to engage the ground by force of gravity. If the bars 46 or connected parts should fail to drop, owing to friction or rust of the parts, the operator may readily force the said bars downwardly by placing his feet upon the treads 57. As the draw-bar frame is being lowered the hopper 5 is free to swing downwardly therewith into an operative position after which the parts are in condition for operation.

I make no claim in this application to the construction and arrangement of the bearing-sleeves 16 and 17 with their shoulders connected with the framing 1 or for the use of some of said sleeves as seats for the drag-bar frame, as the same constitute the subject-matter of a divisional application of this present application.

What I claim is—

1. A planter, comprising an axle, carrying-wheels supporting the same, sleeves loosely surrounding said axle, and having upstanding shoulders, a framework resting upon said sleeves and connected with said shoulders, a pivoted frame connected with the framework and resting upon some of said sleeves, a seed mechanism carried by said pivoted frame and adapted, when the pivoted frame is swung pivotally, to be moved therewith out of operative position, and means for swinging said pivoted frame.

2. In a planter, the combination with a framing and supporting means therefor, of a draft-receiving standard shiftably mounted in said framing, means carried by said standard for preparing soil for the reception of seed, seed mechanism arranged for delivering seed in the rear of said soil-preparing means, the seed-delivering means being movably mounted and capable of movement out of operative condition, means connected with the framing and movable independent thereof for covering the delivered seed, and means for simultaneously shifting said standard and moving said seed mechanism and covering means to inoperative positions.

3. In a planter, the combination with a framing and means supporting the same, a shiftable standard mounted in said framing, soil-preparing means carried by the lower end of said standard, a bar adjustably connected to said standard, a furrow-opener carried by said bar in the rear of the standard, and seed mechanism arranged for delivering seed in the rear of the furrow-opener.

4. In a planter, the combination with a framing and means supporting the same, of a standard shiftable in said framing, soil-preparing means carried by the lower end of said standard, a bar adjustably connected with said standard, a grain-chute arranged contiguous to said bar, seed mechanism arranged for delivering seed into said grain-chute, and a boot carried by said adjustable bar, and telescopically engaging said grain-chute.

5. In a planter, the combination with a framing and means for supporting the same, of a standard shiftably mounted in said framing, soil-preparing means carried by the lower end of said standard, a bar adjustably connected to said standard near the lower end thereof, a grain-chute arranged with its lower end contiguous to said bar, seed mechanism disposed for delivering seed to said grain-chute, and a boot connected to said bar and telescopically engaging the lower end of the grain-chute.

6. In a planter, the combination with a framing, and means for supporting the same, a longitudinally-shiftable, vertical standard arranged in said framing, soil-preparing means carried by the lower end of said standard, a bar connected with said standard and adjustable longitudinally thereof, a furrow-opener carried by said bar, and means for delivering seed in the rear of the furrow-opener.

7. In a planter, the combination with a framing and means for supporting the same, of a longitudinally, shiftable, vertical standard arranged in said framing, soil-preparing means carried by the lower end of said standard, a bar connected with said standard and adjustable longitudinally thereof, seed mechanism sustained by said framing, a delivery-chute for said seed mechanism, and a boot carried by said bar and telescopically engaging said chute.

8. In a planter, the combination with a framing and means for supporting the same, of a vertical standard longitudinally shiftable in said framing, soil-preparing means carried by the lower end of said standard, seed mechanism sustained by said framing, a delivery-chute for said seed mechanism, a bar connected with said standard and adjustable longitudinally thereof, a furrow-opener carried by said bar in front of said chute, and a boot carried by said bar and telescopically engaging said chute.

9. In a planter, the combination with a framing and means for supporting the same, of a vertical standard longitudinally shiftable in said framing, a furrow-opener connected with said standard, a movably-mounted seedbox, seed mechanism, operable only when the seedbox is in its normal position, for delivering seed from said box to a point in the rear of said furrow-opener, and means adjustably connected with the standard for moving the seedbox from its normal position when the standard is shifted.

10. In a planter, the combination with a framing and means for supporting the same, of a longitudinally-shiftable standard arranged in said framing, a furrow-opener connected with said standard, a movable seed mechanism, a gear for actuating said seed mechanism and arranged for being disconnected therefrom when the seed mechanism is moved, means for delivering seed from said seed mechanism to a point in the rear of the furrow-opener, and means connected with the standard and adjustable longitudinally of the standard for moving said seed mechanism when the standard is shifted.

11. In a planter, the combination with a framing and means for supporting the same, of a longitudinally-shiftable standard arranged in said framing, a furrow-opener connected with said standard, a movable seed mechanism adapted to deliver seed at the rear of the furrow-opener, a gear for actuating said seed mechanism arranged for being disconnected therefrom when the seed mechanism is moved, means for moving the seed mechanism, and flexible means connected with the standard for actuating the seed-mechanism-moving means when the standard is shifted.

12. In a planter, the combination with a framing and means for supporting the same, of a standard longitudinally shiftably mounted in said framing, a furrow-opener carried by said standard, a movable seed mechanism arranged to deliver seed at the rear of the furrow-opener, a gear for actuating said seed mechanism arranged for being disconnected therefrom when the seed mechanism is moved, means for moving the seed-mechanism, and a chain connected with the standard and arranged for actuating the seed-mechanism-moving means when the standard is shifted.

13. In a planter, the combination with an axle and means for supporting the same, of a frame and draft-tongue, said frame comprising an inner loop having parallel side bars converging at their front ends and terminating in forwardly-extending parallel portions overlapping the sides of said tongue, bearing-boxes for said axle some of which are secured to the rear ends of said side bars of the inner loop, outer bracing side bars secured to other of said bearing-boxes, said outer side bars converging at their forward ends and terminating in forwardly-extending parallel portions overlapping the forward ends of said inner side bars, and securing means extending through the forward ends of said inner and outer bars and said tongue.

14. In a planter, the combination with an axle and means for supporting the same, of a frame and tongue, said frame comprising inner and outer side bars spaced apart at their rear ends, and having converging forward end portions secured to said tongue, bearing-boxes for said axle secured to the rear separated ends of said side bars, rearwardly-extending drag-bars pivoted to move between said inner and outer side bars above some of said bearing-boxes, and covering devices carried by said drag-bars.

15. In a planter, the combination with an axle and means for supporting the same, of a frame and tongue, said frame comprising inner and outer side bars spaced apart at their rear ends and having parallel portions at the rear part of the frame, and converging forward ends secured to said tongue, pivot-bolts extending through the outer side bars, rearwardly-extending drag-bars having their forward ends pivoted on said bolts, bearing-boxes for said axle secured to said inner and outer side bars, seats on some of said boxes for said drag-bars, and covering devices carried by said drag-bars.

16. In a planter, the combination with a frame, seedbox and delivery-chute, of a vertical shiftable furrow-opener, at the lower end of said chute, a plow and standard in front of said chute, means for vertically shifting said plow and standard, and adjustable connections between said standard and furrow-opener for causing the furrow-opener to move with the standard.

17. In a planter, the combination with a frame, seedbox and delivery-chute, of a vertically-shiftable chute-section and furrow-opener at the lower end of said chute, a plow and standard in front of said chute, means for vertically shifting said plow and standard, and adjustable means connecting said standard with said shiftable chute-section and furrow-opener, said means comprising a bar connected to said chute and furrow-opener, and adjustable bolt connections between said bar and standard.

18. In a planter, the combination with a frame and seed mechanism thereon, of a furrow-forming device and standard therefor, vertically adjustable in front of said seed mechanism, braces connected at their front ends to said frame and embracing said standard, and a roller supported between said braces and engaging said standard.

19. In a planter, the combination with a frame and seed mechanism thereon, said frame having side bars arranged adjacent each other at their forward ends, of a furrow-forming device in front of said seed mechanism, a standard for said furrow-forming device, said standard being vertically shiftable between the forward adjacent ends of said side bars, a roller on said frame engaging said standard, a pair of brace-bars secured to said side bars at their ends and extending on opposite sides of said standard, and a roller journaled between the ends of said brace-bars and engaging the standard.

20. In a planter, the combination with a frame and a seed mechanism thereon, of a furrow-forming device and standard therefor, vertically adjustable in front of said seed mechanism, a roller engaging the front face of said standard, straps between which said roller is arranged and by which said roller is supported extending forwardly from the roller and connected to the frame, and draft means connected to the standard beneath said rollers.

21. In a planter, the combination with a frame and seed mechanism thereon, of a furrow-forming device and a vertical standard therefor shiftable in front of said seed mechanism, guides arranged out of line and engaging the front and rear faces of said standard, and tension-straps extending between said guides and said frame to take the thrust on said guides.

22. In a planter, the combination with a frame and a seed mechanism thereon, of a furrow-forming device and a vertical standard therefor shiftable in front of said seed mechanism, guide-rollers arranged out of line and engaging the front and rear faces of said standard, and tension-braces for taking the thrust on said rollers extending from the rollers to the frame.

23. In a planter, the combination with a frame and seed mechanism thereon, of a standard freely shiftable in said frame, a plow sustained by said standard in front of said seed mechanism, rearwardly-extending drag-bars carried by the frame independently of said plow, covering devices carried by said drag-bars, and a common shifter having means for shifting said standard and raising the drag-bars.

24. In a planter, the combination with a frame, and a seedbox and delivery-chute sustained thereby, of a furrow-forming device mounted in the frame in front of said chute, rearwardly-extending drag-bars pivoted to said frame independently of said furrow-forming device, covering devices carried by said bars, a shifter rock-shaft on the frame, an operating handle-lever therefor, and means operated by said shaft for raising said furrow-forming device and said drag-bars.

25. In a planter, the combination with a framing, an axle sustaining the same, and seed mechanism sustained by the framing, of gearing between said axle and said seed mechanism, a shiftable furrow-forming device, and rearwardly-extending drag-bars mounted on the framing independently of the furrow-forming device, covering devices carried by said drag-bars, and a common shifter for raising said furrow-forming device and drag-bars and simultaneously moving said seed mechanism to a position out of gear.

26. In a planter, the combination with a framing, an axle and seed mechanism, of gearing between said axle and seed mechanism, a shiftable furrow-forming device, and rearwardly-extending drag-bars mounted on the frame independently of said furrow-forming device, covering devices carried by said drag-bars, a rock-shaft on said frame, an operating hand-lever therefor, and means on said rock-shaft for raising said furrow-forming device and drag-bars and for disconnecting said gearing.

27. In a planter, the combination with a framing, an axle and a support therefor, of a seedbox mounted on said framing, seed mechanism for controlling the delivery of seed from said box, gearing between said axle and said seed mechanism for actuating the seed mechanism when the axle is revolved, said seedbox being shiftable to disconnect said gearing, a vertically-shiftable furrow device in front of said seed mechanism, rearwardly-extending drag-bars pivoted to the frame independently of the furrow-forming device, covering devices carried by said bars, a cross rock-shaft, and means on said shaft for raising said furrow-forming device and said drag-bars, and for shifting said seedbox.

28. In a planter, the combination with a frame, of a seed-hopper mounted thereon and capable of being moved to an inoperative position, a vertically-movable standard carried by said frame, and means interposed between the standard and the hopper for moving the hopper to an inoperative position when the standard is elevated.

29. A planter comprising a frame, a vertically-movable standard mounted therein, a draft-rigging carried by the frame, the said standard having a movable engagement in and through the draft-rigging, a seed mechanism mounted on the frame and capable of being moved to an inoperative position, means for raising and lowering the standard, and means for moving the seed mechanism to an inoperative position simultaneously with the upward movement of the standard.

30. In a planter, a supporting-frame comprising a rigid portion and a pivoted portion, a seed-hopper movably mounted on said frame, a standard movable vertically in said frame, soil-preparing means carried by said standard, said standard being guided by the rigid portion of said frame, covering means carried by said pivoted frame portion, and means for elevating said seed-hopper with said pivoted frame portion.

31. In a planter, the combination with a frame, a draft-rigging therefor, a vertically-movable standard movably engaging said rigging, a furrow-opener carried by the standard, a seed mechanism mounted adjacent to the standard and capable of being lifted out of operative position, and lifting means interposed between the standard and the seed mechanism and adapted when the standard is raised beyond a certain point to lift the seed mechanism.

32. A planter comprising a frame, draft means therefor, a vertically-movable standard mounted in the draft means, and directly engaging the draft means, a soil-preparing means carried by said standard, a gearing engaging the standard, and means for operating the gearing for moving the standard vertically.

33. A planter, comprising a frame, a vertically-reciprocating standard arranged therein, a soil-preparing device carried by said standard, draft means for said standard, the standard having a movable engagement with said draft means, a rock-shaft journaled in said frame adjacent to said standard, means adapted to be actuated by the rock-shaft for raising the standard, a seed mechanism mounted on the frame adjacent to the standard, a frame movably connected with the first-mentioned frame, means extending from the seed mechanism in the path of movement of the movable frame in position for being struck by the movable frame when the said movable frame is moved, the said mechanism being movably mounted and adapted to be moved out of operative position, and means whereby the rocking of the rock-shaft for raising the standard moves the seed mechanism to an inoperative position.

34. A planter comprising a frame, a vertically-adjustable furrow-opener carried thereby, a seed-dropping mechanism operating in conjunction with said furrow-opener, the seed-dropping mechanism being movably mounted and capable of being elevated out of operative position, a drag-bar frame pivoted to the first-mentioned frame independently of the furrow-opener, and connections between the furrow-opener, drag-bar frame and seed mechanism for enabling simultaneous lifting thereof.

35. In a planter, the combination with a frame, of a vertical standard longitudinally shiftable in said frame, soil-preparing means carried by the lower end of said standard, draft means connected directly with the standard beneath said frame, bracing means for the standard above the frame, movably-mounted seed mechanism in the rear of the standard, and connections between the standard and the seed mechanism whereby vertical movement may be imparted to both simultaneously.

36. In a planter, a frame, a vertical shiftable standard therein, soil-preparing means carried at the lower end of the standard, a frame surrounding and guiding said standard, draft means connected directly with the standard, seed mechanism movably connected with the frame and capable of being moved out of operative position, and means for moving said standard vertically and for moving said seed mechanism out of operation.

37. A planter, comprising a frame, seed-dropping mechanism movably mounted thereon and capable of being moved out of operative position, a reciprocating standard arranged in said frame in position for being subjected directly to draft, a furrow-opener carried by said standard in front of the seed-dropping mechanism, means for raising and lowering said standard and furrow-opener, and means actuated by said last-mentioned means for moving the seed-dropping mechanism out of operative position.

38. A planter comprising a frame, a standard vertically shiftable therein, means for guiding the standard in its movement and yet capable of exerting draft upon the same, means connected with the frame engaging said standard for preventing displacement thereof due to draft, and means for shifting said standard vertically.

39. A planter, comprising a frame, a seed-dropping mechanism carried thereby, and movably mounted and capable of movement to an inoperative position, a vertically-shiftable standard mounted in the frame adjacent to said seed-dropping mechanism, soil-preparing means carried by said standard, a rack carried by said standard, a gear engaging said rack, means for oscillating said gear, and means for communicating movement from the standard to the seed-dropping mechanism for moving the same to an inoperative position when the standard is elevated.

40. A planter, comprising a frame, a seed mechanism movably mounted on the frame and capable of being moved out of operative position, a chute for said seed-dropping mechanism, a shiftable standard arranged in said frame, soil-preparing means carried by said standard, a draw-bar engaging said standard, means for shifting said standard with respect to the draw-bar for moving the soil-preparing means to an inoperative position, and means for moving the seed-dropping mechanism to an inoperative position when the standard is thus shifted.

41. In a planter, the combination with a frame, of a vertically-adjustable standard sustained thereby, a shovel carried by said standard, a seed-dropping mechanism sustained by the frame and capable of being moved out of operative position, means connected with said standard for raising the same, means for elevating the seed-dropping mechanism, and means projecting from the seed-dropping mechanism for engaging the elevating means when the standard is raised above a certain position.

42. A planter, comprising a frame, a liftable seed-dropping mechanism carried thereon, a gear for actuating said dropping mechanism, beams independently pivoted to said frame, seed-covering means carried by said beams, means for raising the said pivoted beams for elevating the covering means, and means whereby the continued elevation of the pivoted beams above a certain point results in the elevating of the seed-dropping mechanism for disconnecting the gear thereof.

43. A planter, comprising a frame, a seed-dropper sustained thereby, operating mechanism for said seed-dropper arranged capable of disconnection from the dropping mechanism, a shiftable standard arranged in front of said seed-dropper, guiding means carried by said frame and engaging the front and rear edges of said standard, means engaging the standard for raising and lowering the same within said guiding means, and means for disconnecting the seed-dropper from the operating mechanism thereof.

44. In a planter, a supporting-frame, a vertically-shiftable standard movably mounted in the frame, a furrow-opener carried thereby, seed mechanism movably mounted upon said frame and capable of being moved to an inoperative position, covering means movably connected with the frame, and means connected with the standard for elevating said covering means, the said seed mechanism being disposed in the path of movement of said elevating means in position for being struck thereby and moved to an inoperative position when the covering means are elevated.

45. A planter, comprising a frame, a standard vertically adjustable therein, soil-preparing means carried by said standard, a drag-bar frame pivoted to the first-mentioned frame, covering means carried by said drag-bar frame, a hook connected to the standard, and a chain connected to the drag-bar frame having one of its links detachably engaging the hook, means for shifting the standard, and means for depositing seed between the soil-preparing means and the covering means.

46. A planter, comprising a frame, a standard shiftable therein, soil-preparing means carried by said standard, a seed-dropper arranged for depositing seed in the rear of said soil-preparing means, a drag-bar frame pivoted to the first-mentioned frame, and comprising bars disposed on opposite sides of said seed-dropper, covering means carried by said bar, flexible means connecting both of said bars with said standard, and means for raising and lowering the standard.

47. A planter, comprising a frame, a seed-dropper carried thereby, a standard shiftable in said frame, a furrow-opener carried by said standard, the standard comprising substantially parallel plates spaced apart, and a rack secured therebetween, a gear engaging the said rack for shifting the standard, and means for operating the gear.

48. A planter, comprising a frame, a standard shiftable therein, soil-preparing means carried by said standard, a rack carried by the standard, a rock-shaft journaled on said frame, a gear carried thereby in position for meshing with said rack, a lever connected with the rock-shaft for facilitating actuation thereof, and independently-adjustable means interposed between the lever and the shaft by which the extent of movement imparted by the lever to the standard may be varied.

49. A planter, comprising a frame, draft means therefor, a standard vertically shiftable in the frame and movably engaging the draft means, a furrow-opener carried by said standard, seed mechanism movably mounted adjacent to the standard and adapted when moved to be thrown out of operation, covering means in the rear of the seed mechanism, and means interposed between the standard and the covering means by which the standard, when elevated, may also elevate the covering means, and move said seed mechanism.

50. In a planter, a frame, comprising a rigid portion and a portion pivotally connected thereto, a standard vertically shiftable in said rigid portion, seed mechanism in the rear of said standard, said seed mechanism being renderable inoperative, a furrow-opener carried by said standard in advance of the seed mechanism, covering means carried by said pivoted portion, the pivoted portion being constructed and arranged to be freely vibratory within a predetermined limit, means whereby said covering means may be elevated beyond said limit, and means actuated by said elevating means for rendering said seed mechanism inoperative when the said pivoted portion is elevated beyond the said predetermined limit.

51. A planter, comprising a frame, a standard shiftable therein, soil-preparing means carried by said standard, a rock-shaft connected with the standard for shifting the same, a lever loosely mounted on said shaft, a sector rigidly secured to the shaft, a latch carried by the lever and engaging the said sector for adjustably connecting the lever and sector, a rack carried by the said frame, a slotted latch arranged at one side of the lever in position for engaging the rack, and a bolt passed through the lever and the latches, said bolt being arranged to rigidly clamp the first-mentioned latch to the lever and extending through the slot of the second-mentioned latch for permitting movement thereof, and for guiding the second-mentioned latch in its movement.

52. A planter, comprising a frame, an actuating-gear carried thereby, a seed mechanism movably mounted on said frame in position for normally engaging said gear for being actuated thereby, and capable of being moved out of engagement therewith, beams pivotally carried by said frame, means for lifting said beams, projections extending from said seed mechanism into the path of movement of the beams whereby said seed mechanism may be moved by said beams through engagement of said beams with said projections.

53. A planter, comprising a frame, a standard vertically shiftable therein, soil-preparing means carried by said standard, beams pivotally connected with said frame, covering means carried thereby, said beams having curved portions at one end, separate standards carrying the covering means, and clamps carried by the last-mentioned standards and adjustably fitted upon the curved portions of the beams for adjustably retaining the last-mentioned standards at various angles with respect to the surface of the ground.

54. A device of the class described, comprising a frame, a tongue secured thereto, a draw-bar connected to the tongue and projecting rearwardly therefrom, a shiftable standard engaged by said draw-bar and subjected to the draft thereof, soil-preparing means connected with said standard, a bracing-frame rising from the main frame of the standard, and guiding means carried by the bracing-frame and engaging the upper portion of the standard, and means for shifting said standard.

55. A planter, comprising a frame, seed-dropping mechanism carried thereby, a standard shiftable in said frame, soil-preparing means connected therewith, means for shifting said standard, a draw-bar, antifriction means carried by said draw-bar in position for engaging the rear edges of the standard for subjecting the standard directly to draft independently of the frame, and means above the frame for bracing the standard.

56. In a planter, a main frame, a standard vertically shiftable therein, a bracing-frame rising from the main frame, means on the main frame engaging the standard for guiding the same, antifriction-rollers carried by the bracing-frame and engaging the upper portion of the standard, and means for shifting the standard.

57. A planter, comprising a frame, draft means connected therewith, a standard vertically shiftable in said frame and directly engaged by said draft means for subjecting the said standard to draft, means for shifting the said standard, a seeding device movably mounted adjacent to the standard and adapted when moved to be thrown out of operation, means for moving the seeding device, and flexible means depending from said standard and engaging said seeding device moving means for causing the same to be moved with said standard.

58. A planter, comprising a frame, a standard vertically shiftably mounted therein, a seed-dropper movably mounted and adapted when moved to be thrown out of operation, movement-transmitting means interposed between the standard and seed-hopper and comprising a pivoted member, means connecting said pivoted member with said standard, and means projecting from the seed-dropper into the path of the movement of the pivoted member for causing the seed-dropper to be moved when struck by the said pivoted member.

59. A planter, comprising a rigid frame, a frame pivoted thereon, a cultivator-standard movably mounted in the rigid frame, a seeding device carried by the pivoted frame, means for operating the seeding device arranged for being in operative relation thereto when the pivoted frame is in one position and out of operative relation thereto when the pivoted frame is swung from such position, means for elevating the cultivator-standard, means for raising the pivoted frame for moving the seeding device into an inoperative position when the cultivator-standard is operated, and covering means pivotally connected with said rigid frame independently of the standard.

60. A planter, comprising a rigid frame, pivoted frames carried thereby, a seeding mechanism carried by one of said pivoted frames in position for being thrown out of operation when the frame carrying the same is swung upon its pivot, covering means carried by the other of said pivoted frames, means for moving the last-mentioned pivoted frame, and means actuated thereby for moving the frame carrying the seeding mechanism for throwing the seeding mechanism out of operation.

61. In a planter, the combination with a frame, of a standard vertically shiftable therein, soil-preparing means carried by said standard, draft means connected directly with the standard, a movable seed-dropper carried by the frame and adapted when moved to be thrown out of operation, and means capable of lifting said cultivator and by its continued movement of lifting the seed-dropper.

62. In a planter, the combination with a main frame, of a supplementary frame pivoted to the main frame and extending rearwardly of such pivotal connection, a furrow-opener, seedbox and covering-shovels adapted to be elevated when said supplementary frame is elevated, the said seedbox being adapted in operation to deposit seed, and said seedbox being inoperative when elevated, and a sweep supported in advance of the furrow-opener and in line therewith.

63. In a planter, the combination with a main frame, of a supplementary frame connected therewith and free to swing in vertical planes, a furrow-opener and seedbox adapted to be moved when the pivoted frame is swung upon its pivot, said seedbox being inoperative when thus moved, the said seedbox being adapted in operation to deposit seed, covering-shovels carried by the supplementary frame, and a sweep arranged in advance of the furrow-opener.

64. In a planter, the combination with a main frame, of a supplementary frame pivotally connected thereto, and free to swing in vertical planes, a seedbox adapted to be moved by the pivoted frame, the said seedbox being inoperative when thus moved, said seedbox being adapted in operation to deposit seed, a furrow-opener arranged beneath said seedbox, covering-shovels arranged in the rear of said furrow-opener and out of line therewith, and a sweep arranged in advance of said furrow-opener in line therewith.

65. In a planter, the combination with a main frame, of a supplementary frame pivotally connected thereto and extending rearwardly from the point of its pivot, means for swinging said supplementary frame in vertical planes, a seedbox disposed above said supplementary frame and adapted to be moved with said frame, the said seedbox being adapted in operation to deposit seed, and being arranged to be thus moved out of operative position, a furrow-opener arranged in advance of the discharge from the seedbox, and covering means carried by the supplementary frame in the rear of said furrow-opener.

66. In a planter, the combination with a main frame, of a supplementary frame pivotally connected thereto, and comprising bars spaced apart, a seedbox disposed between the vertical planes of said bars and adapted to be moved when said pivoted frame is moved upon its pivot, the seedbox being constructed in operation to deposit seed, and being adapted to be thrown out of operation when moved with said pivoted frame, a furrow-opener disposed in advance of the discharge from said seedbox, covering means carried by said supplementary frame in the rear of the furrow-opener, and a vertically-adjustable sweep arranged in advance of the furrow-opener.

67. In a planter, the combination with a main frame, of a supplementary frame pivoted thereto, and comprising side bars, a seedbox arranged between the vertical planes of the said side bars, the seedbox being constructed in operation to deposit seed, and being adapted to be thrown out of operation when moved, means for effecting movement of said seedbox when said supplementary frame is moved upon its pivot, a furrow-opener disposed in advance of the discharge from the seedbox, and covering means carried by said supplementary frame in the rear of said furrow-opener.

68. In a planter, the combination with a main frame, of a supplementary frame connected thereto, a movably-mounted seedbox adapted in operation to deposit seed and being arranged to be thrown out of operation when moved, a furrow-opener disposed beneath the same, covering means carried by said supplementary frame, a sweep arranged in front of said furrow-opener, and means for effecting simultaneous upward movement of said seedbox, sweep, furrow-opener and covering means.

69. In a planter, the combination with a main frame, of a supplementary frame pivotally connected therewith, and extending rearwardly from the pivot-point, said pivoted frame comprising side bars, a seedbox disposed between the extended planes of said side bars and arranged to be moved for being thrown out of operation, said box in operation being constructed to deposit seed, means for moving said seedbox when the supplementary frame is swung on its pivot, means for opening a furrow for the deposited seed and covering means carried by said supplementary frame.

70. In a planter, the combination with a main frame, of a supplementary frame movable in vertical planes with respect to the main frame, a movable seed-hopper supported independently of said supplementary frame and arranged for permitting independent movement of the supplementary frame to a certain degree and movable with the supplementary frame beyond such degree, and operating-gear for the seed-hopper adapted to be thrown out of operation by movement of the hopper.

71. In a planter, the combination with a main frame, a seed-hopper movably mounted thereon, a seed-dropping mechanism for the hopper adapted to be thrown out of operation when the hopper is moved, a supplementary frame movable independently of said hopper, and means for imparting movement from the supplementary frame to the hopper.

72. In a planter, the combination with a frame, of a seed-hopper mounted thereon and capable of being moved to an inoperative position, a standard vertically movable in said frame, means for applying draft directly to the standard, and means interposed between the standard and the seed-hopper for moving the hopper to an inoperative position when the standard is elevated.

73. In a planter, a frame, a cultivator sustained thereby, a movable seed-hopper adapted when moved to be thrown out of operation, a vertically-movable standard, and means whereby said standard when elevated will pull said seed-hopper and cultivator to inoperative positions.

74. In a planter, the combination with a frame, of a standard shiftable therein, a movable seed mechanism sustained by said frame and adapted when moved to be thrown out of operation, a chain for transmitting movement from the standard to the seed mechanism, and means detachably connecting the chain with the standard, the said connecting means being adapted to be engaged by any one of several of the links of the chain.

In testimony whereof I hereunto affix my signature in presence of two witnesses.

WILFORD H. HOLSCLAW.

Witnesses:
A. G. RENAU,
G. WEATHERFORD.